US008650229B2

(12) United States Patent
Fuentes, II

(10) Patent No.: US 8,650,229 B2
(45) Date of Patent: Feb. 11, 2014

(54) SYSTEM AND METHOD FOR REMOVING MASTER FILE TABLE ($MFT) FILE RECORD SEGMENTS (FRS)

(76) Inventor: Hector Fuentes, II, Carson City, NV (US)

( * ) Notice: Subject to any disclaimer, the term of this patent is extended or adjusted under 35 U.S.C. 154(b) by 0 days.

(21) Appl. No.: 12/948,766

(22) Filed: Nov. 18, 2010

(65) Prior Publication Data

US 2012/0131072 A1 May 24, 2012

(51) Int. Cl.
*G06F 17/30* (2006.01)
(52) U.S. Cl.
USPC ................................. 707/822; 707/823
(58) Field of Classification Search
USPC .................... 707/822, 823; 714/5
See application file for complete search history.

(56) References Cited

U.S. PATENT DOCUMENTS

| 6,314,437 B1 * | 11/2001 | Starek et al. ................ 1/1 |
| 6,377,958 B1 * | 4/2002 | Orcutt ........................ 707/690 |
| 7,523,343 B2 * | 4/2009 | Leis et al. ................. 714/5.11 |
| 7,685,189 B2 * | 3/2010 | Mittal et al. ................ 707/686 |

OTHER PUBLICATIONS

Mike Wilkinson; "NTFS bit by byte"; Champlain College, Nov. 2011, 42 pages.*

* cited by examiner

*Primary Examiner* — Monica Pyo

(57) ABSTRACT

A system and method for removing Master File Table ($MFT) File Record Segments (FRS) from Microsoft's New Technology File System (NTFS) is described. In one embodiment, the present invention initializes the NTFS volume to detect the $MFT Physical Disk Address; then calculates total FRS to remove; in sequence initiates a loading algorithm while applying a $MFT fixup parameter; then parses the FRS via MFT_RECORD_HEADER structures; and in succession, executes an instructional writing parameter which triggers recursive logical programming instructions to remove the FRS's, using direct access at sector aligned FRS offsets.

2 Claims, 14 Drawing Sheets

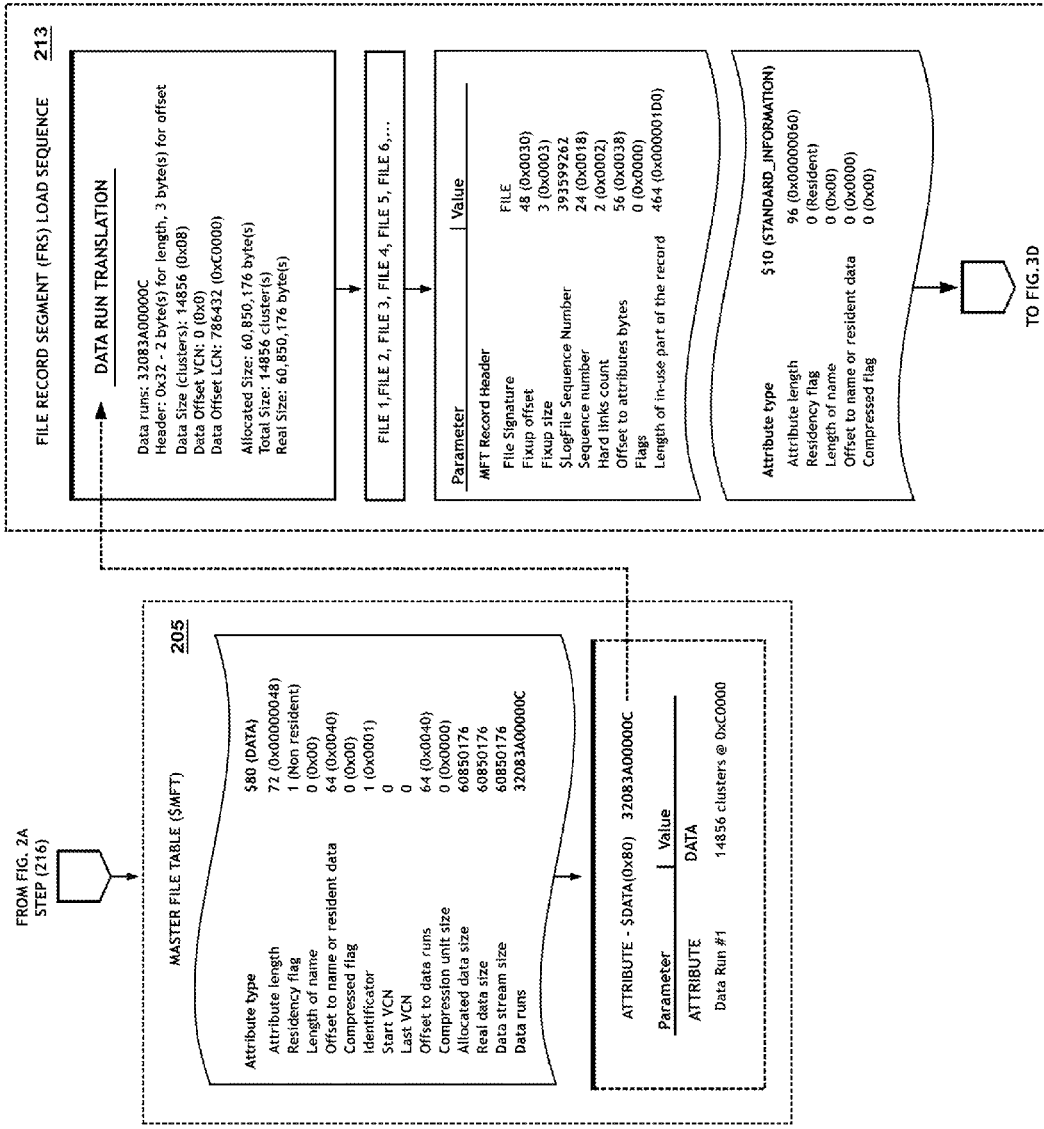

FROM FIG. (2E, 3C) 

| Attribute type | $30 (FILE_NAME) |
|---|---|
| Attribute length | 112 (0x00000070) |
| Residency flag | 0 (Resident) |
| Length of name | 0 (0x00) |
| Offset to name or resident data | 0 (0x0000) |
| Compressed flag | 0 (0x00) |
| Identificator | 6 (0x0006) |
| Attribute length | 82 (0x00000052) |
| Offset to attribute data | 24 (0x0018) |
| Indexed flag | 0 (0x01) |
| Parent MFT record number | 9591 |
| Parent MFT record sequence | 1 |
| Date created | 1/2/1601 5:00:00 PM |
| Date modified | 1/2/1601 5:00:00 PM |
| Date record modified | 7/30/2010 6:37:14 AM |
| Date last access | 7/30/2010 6:37:14 AM |
| Real size | 12288 |
| File attributes | 0x0 (None) |
| Security ID | 0 |
| File name length | 8 |
| File name type | 2 |
| File name | $13AD1~1 |

| Attribute type | $80 (DATA) |
|---|---|
| Attribute length | 96 (0x00000060) |
| Residency flag | 1 (Non resident) |
| Length of name | 0 (0x00) |
| Offset to name or resident data | 0 (0x0000) |
| Compressed flag | 0 (0x00) |
| Identificator | 3 (0x0003) |
| Start VCN | 0 |
| Last VCN | 0 |
| Offset to data runs | 64 (0x0040) |
| Compression unit size | 0 (0x0000) |
| Allocated data size | 12288 |
| Real data size | 12288 |
| Data stream size | 12288 |
| Data runs | 3101411C382102F72B |

FIG. 3D

SYSTEM AND METHOD FOR REMOVING MASTER FILE TABLE ($MFT) FILE RECORD SEGMENTS (FRS)

REFERENCES

Microsoft TechNet Library (2003, Mar. 28)
How NTFS Works
Retrieved Mar. 29, 2008 from the World Wide Web:
http://technet.microsoft.com/en-us/library/cc781134 (WS.10).aspx
Mark Russinovich (2006, Nov. 1)
SDelete v1.51
Retrieved Jan. 10, 2008 from the World Wide Web:
http://technet.microsoft.com/en-us/sysinternals/bb897443.aspx
Concept—Data Runs (2001, Jul. 11)
Retrieved Oct. 12, 2008 from the World Wide Web:
http://www.reddragonfly.org/ntfs/concepts/data_runs.html
Boyne Pollard, Jonathan (2007)
All about BIOS Parameter Blocks
Retrieved Jan. 19, 2009 from the World Wide Web:
http://homepages.tesco.net/~J.deBoynePollard/FGA/bios-parameter-block.html
Russon, Richard & Fledel, Yuval (2004)
NTFS Documentation
Retrieved Jan. 23, 2009 from the World Wide Web:
http://data.linux-ntfs.org/ntfsdoc.pdf
Microsoft MSDN (2008, Mar. 5)
Creating and Opening Files
Retrieved Mar. 5, 2008 from the World Wide Web:
http://msdn.microsoft.com/en-us/library/aa363874(VS.85).aspx
Sedory, Daniel B. (2007, Jun. 6)
An Examination of the NTFS Volume Boot Record
Retrieved Oct. 12, 2008 from the World Wide Web:
http://mirror.href.com/thestarman/asm/mbr/NTFSBR.htm
COS/PSA 413 (2005)
Guide to Computer Forensic Investigations
Retrieved Oct. 12, 2008 from the World Wide Web:
perleybrook.umfk.maine.edu/slides/fall%202005/cos413/cos413 day3.ppt
Polytechnic University (2004, Apr. 26)
Digital Forensics Module 11 CS996
Retrieved Oct. 12, 2008 from the World Wide Web:
isis.poly.edu/courses/cs996-forensics/Lectures/forensics_module11.pot
CCSR Center for Computer Security Research CSE 4273/6273 (2007, Oct. 15)
Intro to Cyber Crime and Computer Forensics
Retrieved Oct. 12, 2008 from the World Wide Web:
http://www.cse.msstate.edu/~dampier/CSE6273/Slides/
Mississippi State University Department of Computer Science
CSE 4273/6273 (2009, Oct. 2)
Intro to Cyber Crime and Computer Forensics
Retrieved Jan. 6, 2010 from the World Wide Web:
www.cse.msstate.edu/~dampier/CSE6273/Slides/CSE6273-File%20Systems-4.ppt
DIY DataRecovery (2007, Sep., 9)
A Bit more about Disk Structures
Retrieved Feb. 10, 2008 from the World Wide Web:
http://www.diydatarecovery.nl/kb_disk_general_article.htm
Microsoft MSDN Library Visual Studio 2005 (2005, March)
Master File Table
Retrieved from MSDN Library Visual Studio 2005, CD-ROM, 2005
Microsoft MSDN
FSCTL_GET_NTFS_VOLUME_DATA Control Code
Retrieved Dec. 12, 2008 from the World Wide Web
http://msdn.microsoft.com/en-us/library/aa364569(VS.85).aspx
Microsoft MSDN
FSCTL_GET_VOLUME_BITMAP Control Code
Retrieved Dec. 12, 2008 from the World Wide Web
http://msdn.microsoft.com/en-us/library/aa364573(VS.85).aspx
Microsoft MSDN
FSCTL_GET_NTFS_FILE_RECORD Control Code
Retrieved Dec. 12, 2008 from the World Wide Web:
http://msdn.microsoft.com/en-us/library/aa364568(VS.85).aspx
Microsoft MSDN Library Visual Studio 2005 (2005, March)
FSCTL_GET_RETRIEVAL_POINTERS
Retrieved from MSDN Library Visual Studio 2005, CD-ROM, 2005
Hurlbut, Dustin (2005)
Orphans in the NTFS World
AccessData Training
Retrieved May 3, 2009 from the World Wide Web:
http://www.accessdata.com/media/en_US/print/papers/wp.NT_Orphan_Files.en_us.pdf
Wilders Security Forums (2008)
Retrieved Oct. 5, 2008 from the World Wide Web:
http://www.wilderssecurity.com/archive/index.php/t-208251.html
Gutmann, Peter (1996, Jul. 22)
Secure Deletion of Data from Magnetic and Solid-State Memory
Retrieved Feb. 1, 2008 from the World Wide Web:
http://www.cs.auckland.ac.nz/~pgut001/pubs/secure_del.html
Microsoft MSDN Library Visual Studio 6.0 (1998)
WriteFile
Retrieved from MSDN Library, CD-ROM, 1998
Microsoft MSDN Library Visual Studio 6.0 (1998)
CreateFile
Retrieved from MSDN Library, CD-ROM, 1998
Microsoft MSDN Library Visual Studio 6.0 (1998)
DeviceIoControl
Retrieved from MSDN Library, CD-ROM, 1998
Microsoft MSDN Library Visual Studio 6.0 (1998)
ReadFile
Retrieved from MSDN Library, CD-ROM, 1998
Microsoft MSDN Library Visual Studio 6.0 (1998)
SetFilePointer
Retrieved from MSDN Library, CD-ROM, 1998
Microsoft MSDN Library Visual Studio 6.0 (1998)
SetFilePointerEx
Retrieved from MSDN Library Visual Studio 2005, CD-ROM, 2005
Microsoft MSDN Library Visual Studio 2005 (2005, March)
WriteFileEx
Retrieved from MSDN Library Visual Studio 2005, CD-ROM, 2005
Microsoft MSDN Library Visual Studio 2005 (2005, March)
LockFile
Retrieved from MSDN Library Visual Studio 2005, CD-ROM, 2005
Microsoft MSDN Library Visual Studio 2005 (2005, March)
LockFileEx Retrieved from MSDN Library Visual Studio 2005, CD-ROM, 2005
Microsoft MSDN Library Visual Studio 2005 (2005, March) FlushFileBuffers
Retrieved from MSDN Library Visual Studio 2005, CD-ROM, 2005

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever. The following notice applies to the software and data as described below and in the drawings hereto: Copyright 2001-2010, Hector Fuentes II, All Rights Reserved.

FIELD OF THE INVENTION

The present invention relates to computer file systems. In particular, but not by way of limitation, the present invention relates to techniques for removing File Record Segments (FRS) from a New Technology File System (NTFS) Master File Table ($MFT).

BACKGROUND OF INVENTION

Operating systems have a systematic way of storing and deleting data. When a file (object) is created in an NTFS volume the location of its sectors, its name, type, and everything that makes up the file is recorded in the Master File Table ($MFT). The $MFT is a core system file organized for file record and attribute analysis that contains information about every file and directory on the volume, including the $MFT itself.

When a file is deleted the icon representing the file is removed from the User's view; there is no suitable verification by the system that the file was truly deleted or removed from the User's computer. From the Users perspective the file is no longer visible; therefore the file is assumed to have been deleted. And given that the User may have used an application designed to overwrite the file data, (at specific offsets with a logical sequence of binary data), there's no questioning that the file has been removed from the User's computer. However when a User attempts to verify if the files were actually deleted, using over-the-counter low-level forensic tools, what puzzles the User is that their "supposed" deleted files are still intact.

What further puzzles the User, is that the same high-end forensic tools used to recover data also offer file removal options, claiming to permanently remove the file, however when the User uses the forensic tool to remove the file and then verifies if the file was deleted, the file again is "completely" intact.

What the user does not know is that applications designed to remove critical data do not remove the file's header or stream descriptors (Attributes) from the $MFT; nor do they execute algorithms that target the removal of the deleted file records possible sensitive data located after End Of Marker (0xFFFFFFFF) to end of file record. They only "attempt" to alter the files data directly and indirectly by bypassing disk cache and on sector boundaries use conventional overwriting techniques to saturate the disk to the greatest depth possible with alternating 0x92, 0x49, 0x24, 0xCC, 0x11, 0x99, 0xAA, 0xB6, 0xDB, 0x6D 0xFF, or 0x00 type byte patterns of binary data.

Secondly; because of public demand, others like Mark Russinovich via "SDelete" have attempted to remove file records (FRS) indirectly by attempting to trick the system; his method of creating as many inline files to force the system to append its $MFT records only slows the systems input/output performance as well as alter the integrity of the NTFS; moreover the saturation of inline files critically ruins the system in the event of a power failure or otherwise; and depending on the state of the $MFT at the time of execution, the saturation of 1 KiB files can cause the system to cease responding to inputs or crash; and further cause and has caused the $MFT $DATA (0x80) attribute to become fragmented thereby forcing the User to reformat to restore system stability or deal with a system that can be unresponsive.

Since the $MFT is not designed to append itself, on file or folder deletion, all pointers that point to overwritten or non-overwritten clusters stay completely intact within the deleted FRS stream descriptors (Attributes) and therefore are open to forensic examination.

The present invention addresses the above limitations allowing a typical User, not skilled in the art of computer forensics, to remove a $MFT FRS in a forensically sound manner thus allowing the "true" removal of a file residing within an NTFS $MFT. Furthermore the present invention increases efficiency within the system and does not hinder performance like previous methods.

SUMMARY OF THE INVENTION

Illustrative embodiments of the present invention that are shown in the drawings are summarized below. These and other embodiments are more fully described in the Detailed Description section. It is to be understood; however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

Embodiments of the present invention include systems and methods for removing File Record Segments from a New Technology File System $MFT. In one embodiment is a method for removing FRS from a NTFS $MFT by way of reading the boot sector; locating the $MFT ($MftStartLcn) starting cluster; loading the $MFT FRS into memory; applying a $MFT fixup parameter; parsing the FRS records by means of MFT_RECORD_HEADER structures; loading the target FRS byte offsets; verifying if the file record is in use; and at sector aligned FRS offsets, overwriting each byte until end-of-record using direct access by way of recursive Application Program Interface (API) calls.

In another embodiment is a system comprising of interrelated program modules channeled through a MFT Engine, configured to analyze a $MFT associated with an NTFS volume. Whereas the User specifies which file record segments to remove; triggering the present invention to initialize the volume to detect the $MFT Physical Disk Address ($MftStartLcn) starting cluster; while loading the FRS into memory; on load completion, the present invention's MFT subroutines applies a $MFT fixup parameter and parses the FRS records by way of MFT_RECORD_HEADER structures; the present invention's writing modules then executes a recursive instructional writing sequence parameter and commences logical programming instructions to remove the FRS's using direct access at sector aligned FRS offsets. At end of program instructions (task), the present invention's reporting modules returns statistical data of the removal of previous file records (FRS) to the User. These and other embodiments are described in more detail herein.

A technical advantage of the present invention is that it allows for "true" forensic removal of a file record segment (FRS) entry residing within a NTFS $MFT.

Another technical advantage is that when the present invention is compiled into an executable application, one does not have to be skilled in the art of computer forensics to "truly" remove file records in a forensically sound manner from one's computer.

A further technical advantage is that the present invention removes previous deleted files that the User once thought were gone.

A further technical advantage is that the high-end forensic tools used to recover data will fail to recover "any" file records (FRS) previously deleted from the NTFS $MFT; unlike current top commercial applications that have failed and will continue to fail in this task.

A further technical advantage is that it forces the system to consolidate and reuse the freed sectors more efficiently; thereby reducing fragmentation unlike previous art which greatly impacted system performance.

A further technical advantage is that when the present invention is embedded into Microsoft's New Technology File System (NTFS) or any other NTFS driven operating system such as Linux or Mac OS X Leopard, it decreases fragmentation of the $MFT, increases system performance, and provides User's with the built-in option to "truly" delete files from their computer as though they never existed.

BRIEF DESCRIPTION OF THE DRAWINGS

The previous mentioned and other objects and features of the present invention will become apparent from the following description of preferred embodiments given in conjunction with the accompanying drawings, wherein:

FIGS. 2D, 3B, 3C, and 3D are technical schematic representations of the Master File Table ($MFT) in accordance with one implementation of the present invention;

DETAILED DESCRIPTION

The present invention is directed to a system and method for the rapid removal of a File Record Segment (FRS) from a Master File Table ($MFT) of a New Technology File System (NTFS). Although not required, the invention will be described in the general context of computer-executable instructions, such as program modules, being executed by a personal computer.

Figure 1:
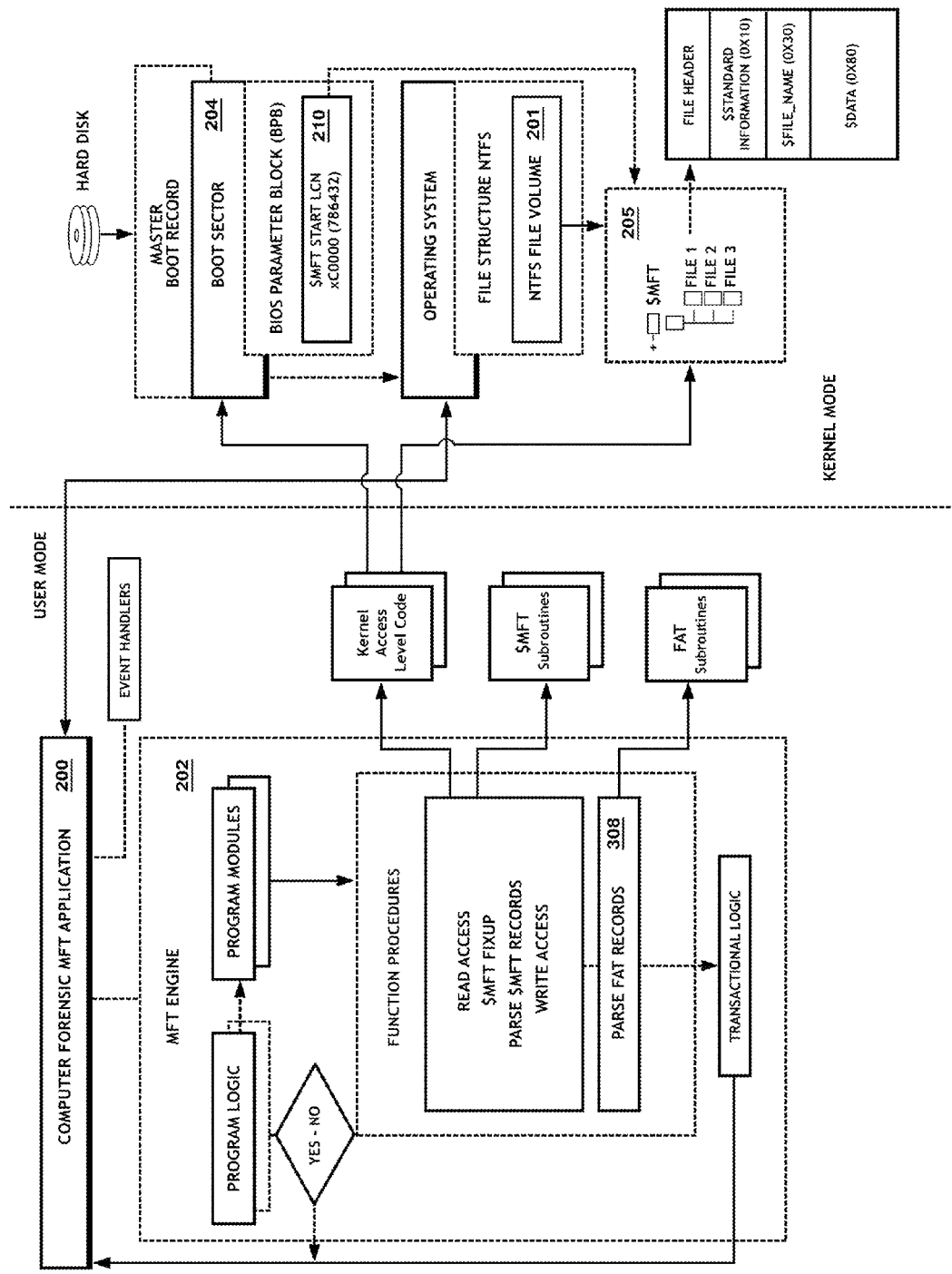
FIG. 1 is a technical schematic representation of the main components in accordance with an exemplary embodiment of the present invention.

In accordance with an illustrative embodiment of the invention, FIG. 1 is a diagram of a computer system 200 which includes a MFT Engine 202 designed to systematically analyze an NTFS volume and remove FRS's from the $MFT. The MFT Engine comprises of instructional programming procedures and routines (machine code) designed to systematically run in automation mode or executed based on User input via its interrelated procedure modules as shown in FIG. 1 (202)

The MFT Engine embodies program logic, program modules, function procedures, standard Application Program Interface (API) calls, $MFT/FAT subroutines and module level code to gain access to system memory and hardware as shown in FIG. 1

The present invention system and methods may be applied to any file system, including without limitation, New Technology File System (NTFS) and a File Allocation Table (FAT) file system (FAT Record Entries). FIG. 1 (308)

Figure 3A:
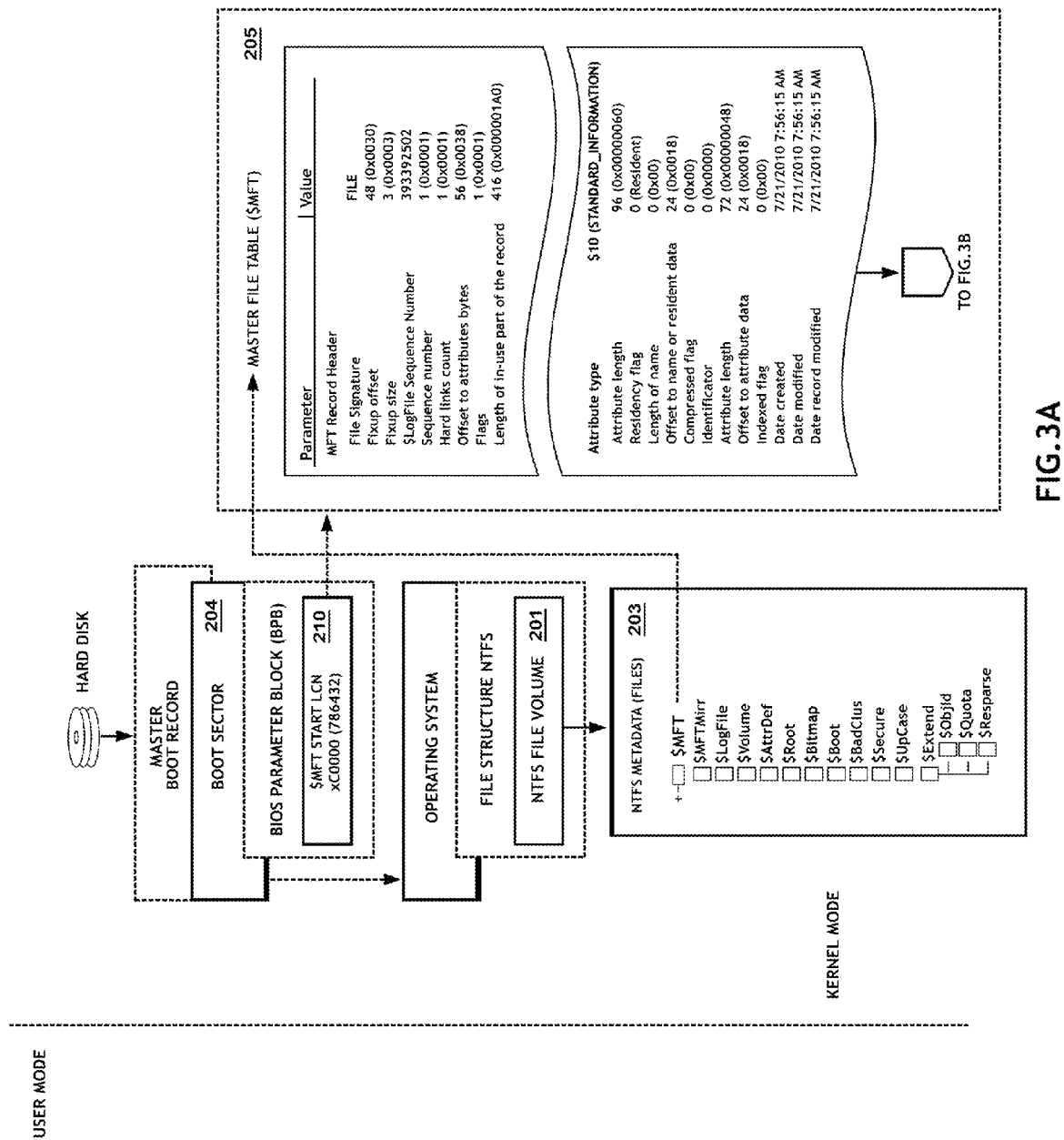
FIG. 3A is a technical diagram of an Operating System, File Structure, File Volume, and Metadata Files in relationship to the Master File Table ($MFT) structure in accordance with an embodiment of the present invention.

The present invention is used on an Operating System. An Operating System can include a File Structure, a File Volume, a File Volume Directory, Files, and File Folder objects. A File Structure is an organization of files that are grouped together according to purpose. One embodiment of the File Structure is Microsoft's New Technology File System (NTFS). FIG. 3A (201)

Figure 3B:
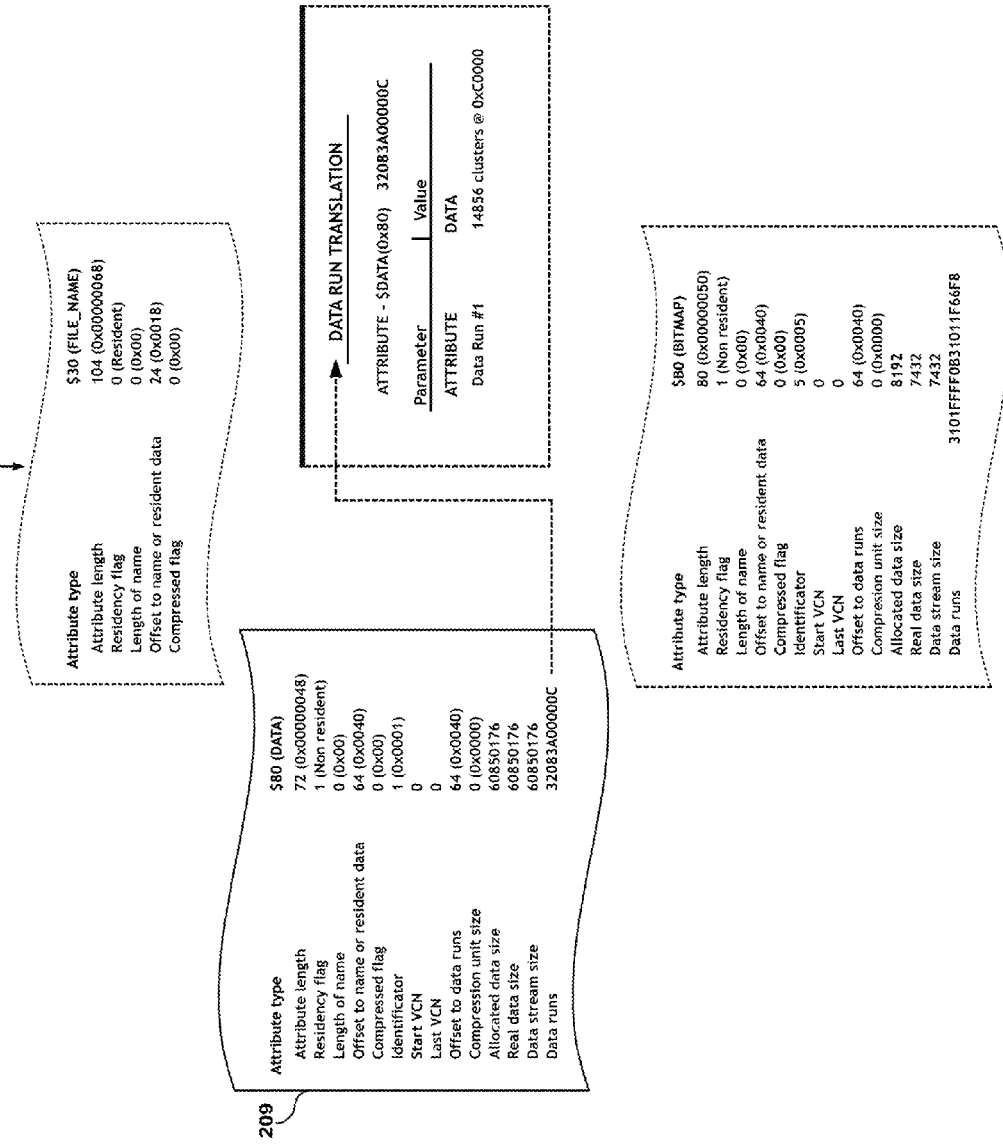

During a format, the NTFS format process creates a set of metadata files FIG. 3A (203) used to implement the file system structure. One embodiment of the NTFS File Volume Directory is a Master File Table ($MFT). The $MFT is a core system file organized for file record and attribute analysis that contains information about every file and directory on the volume, including the $MFT itself. The default size of a FRS in the $MFT is 1024 bytes. A File Record Segment (FRS) (or Base File Record) entry consists of a header and a plurality of attributes which describe the framework of the file record FIG. 3A (205) and FIG. 3B Each FRS entry describes a file (object) on the volume and has a record number that equals the byte position inside the $MFT divided by 1024. To prevent fragmentation of the $MFT, 12.5 percent of the volume is reserved for the $MFT Zone. The $MFT Zone is used by the $MFT for $MFT expansion.

Figure 2A:
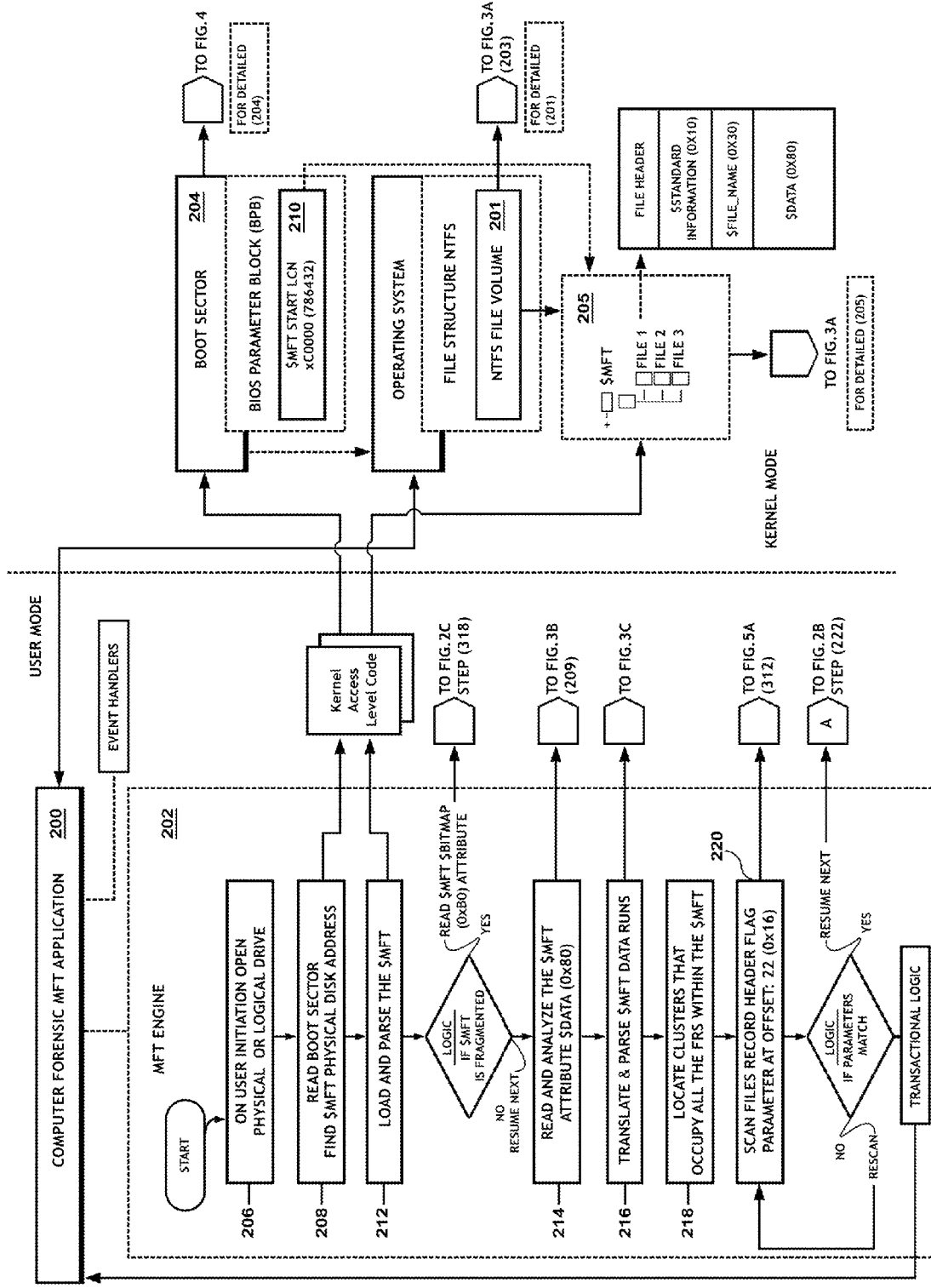
FIGS. 2A, 2B, and 2C are detailed illustrative flowcharts of a method for identifying and removing FRS that are not accessible by an operating system of the protected computer in accordance with another embodiment of the present invention.
Figure 2B:
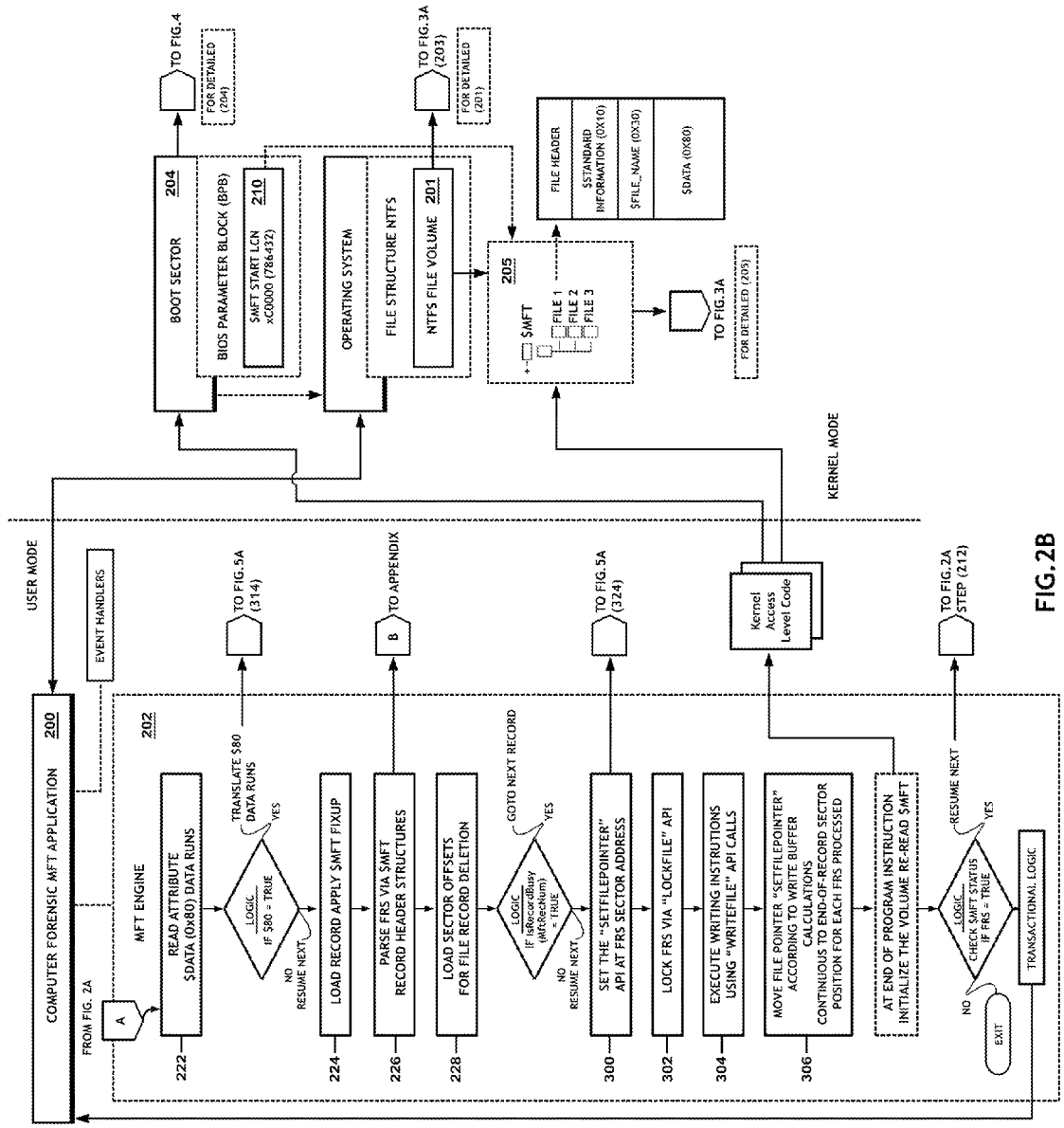

In the preferred embodiment of the invention illustrated in FIG. 2A the User initiates the present invention by way of a command window of options that trigger conditional branching algorithms to gain access to the collection of logical structures (raw data) on the active partition of the computer device.

Figure 4:
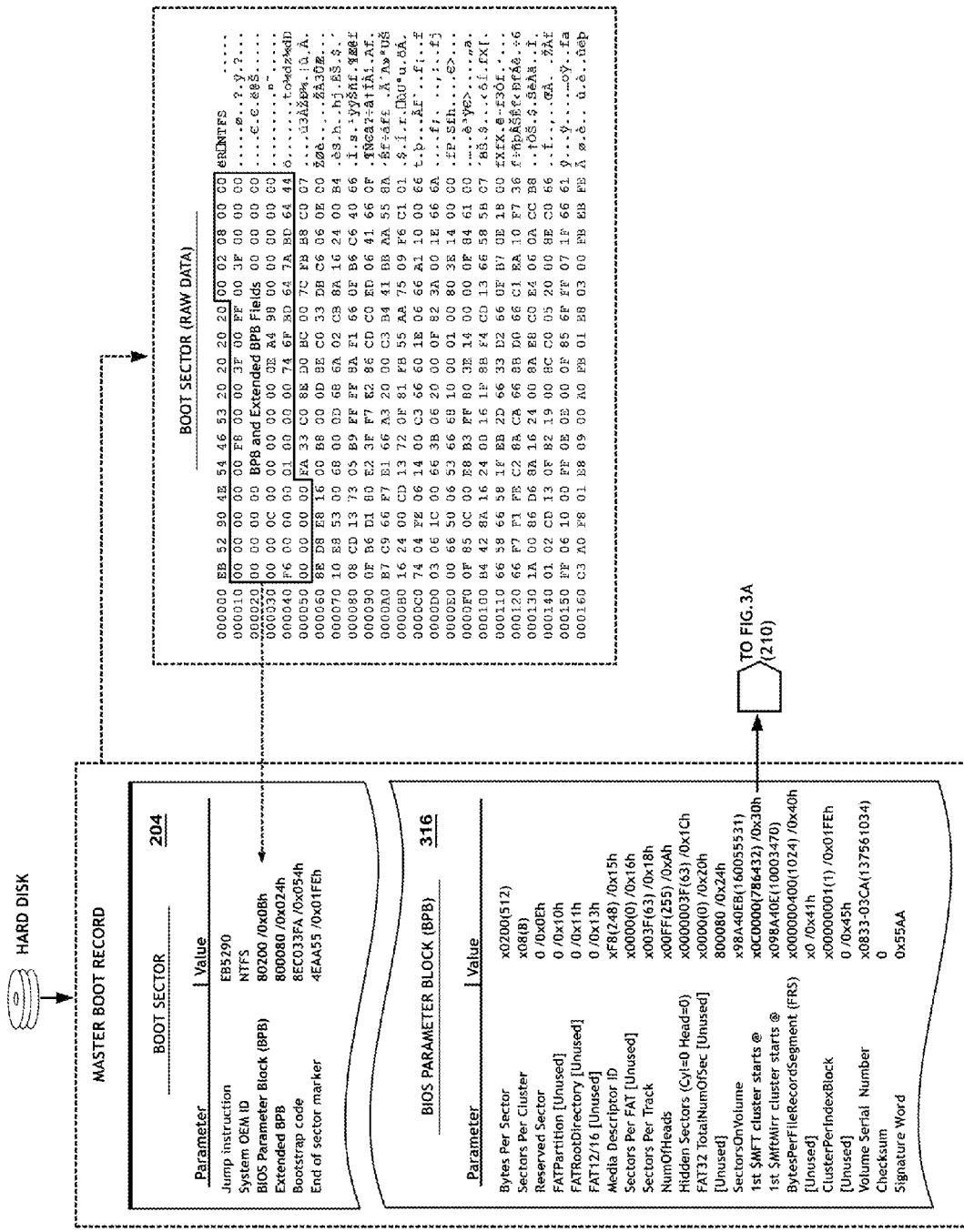
FIG. 4 is a detailed illustrative diagram of a Boot Sector of a protected computer in accordance with one implementation of the present invention.

In response to User input, the present invention acquires direct access to read the NTFS Boot Sector FIG. 2A (208) which is located at the beginning of the first sector of a primary partition (or logical volume); upon reading the boot data, the present invention scans for an NTFS signature to verify which operating system formatted the drive; if a valid NTFS signature exist, then the present invention executes a loading algorithm to load the Bios Parameter Block (BPB) data structure as shown in FIG. 4 (316) and transfers BPB data into memory while simultaneously determining the byte offset position of the $MFT (Physical Disk Address-$MftStartLcn) starting cluster; the algorithms then determine the $MFT Valid Data Length (MFTValidDataLength) using "CreateFile" API and "DeviceloControl" by way of control code FSCTL_GET_NTFS_VOLUME_DATA structure.

Figure 2C:
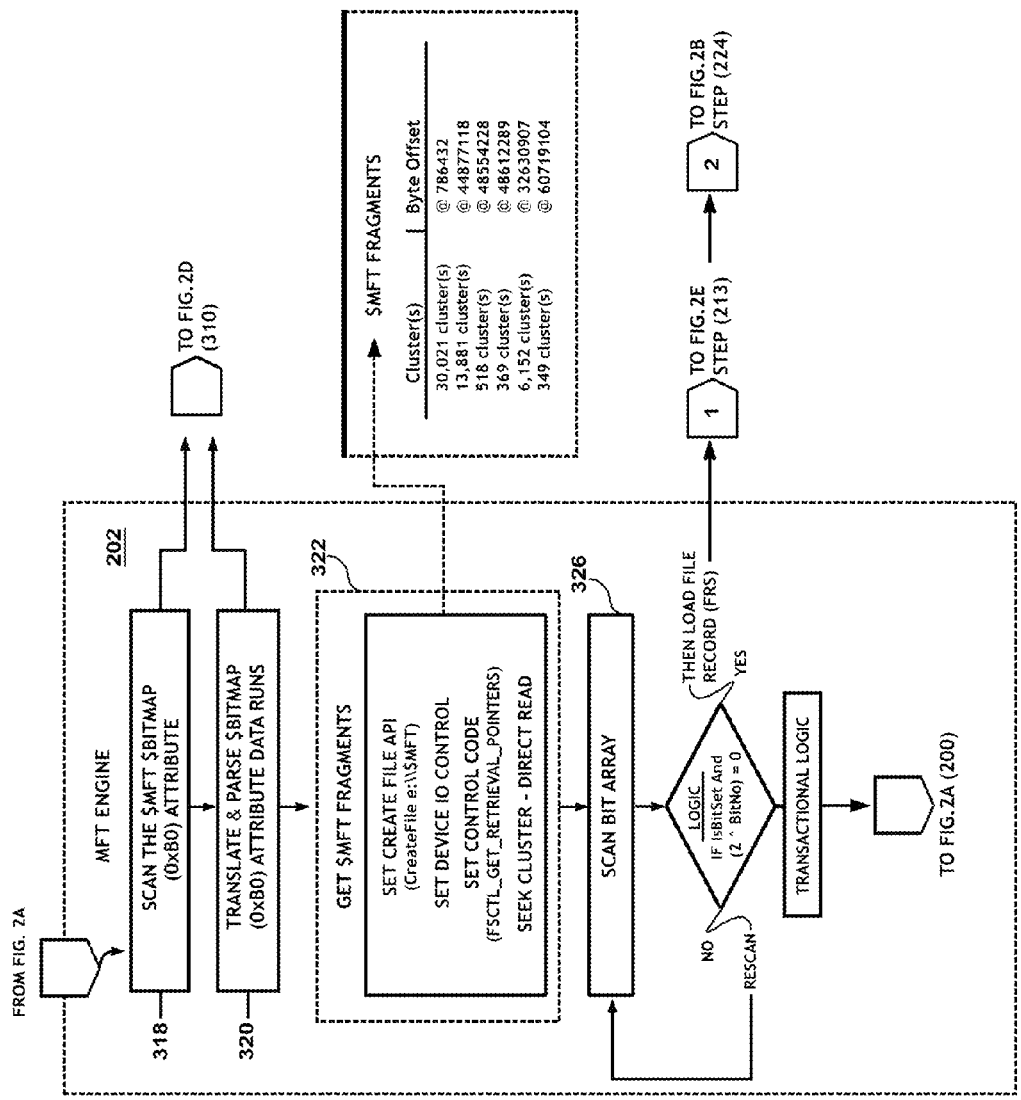
Figure 2D:
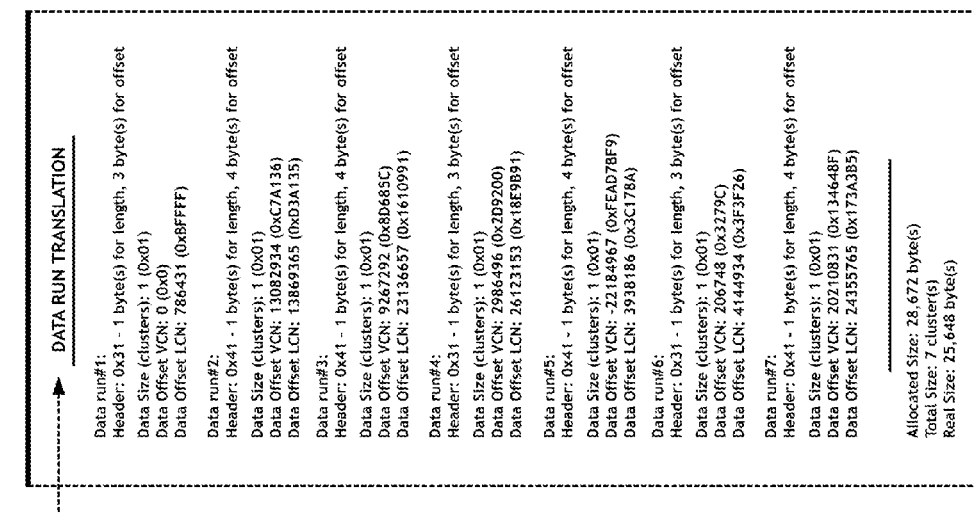
Figure 2D:
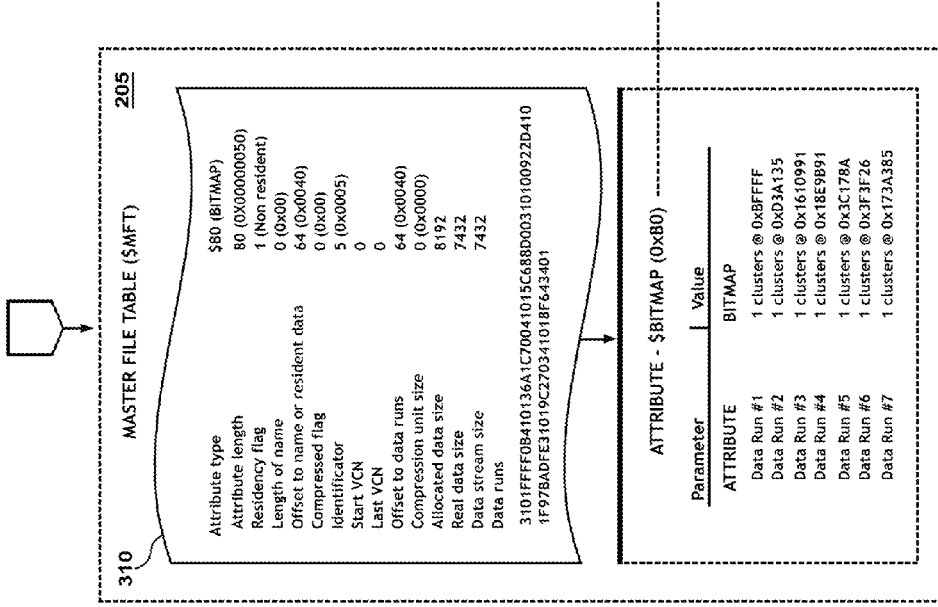
Figure 2E:
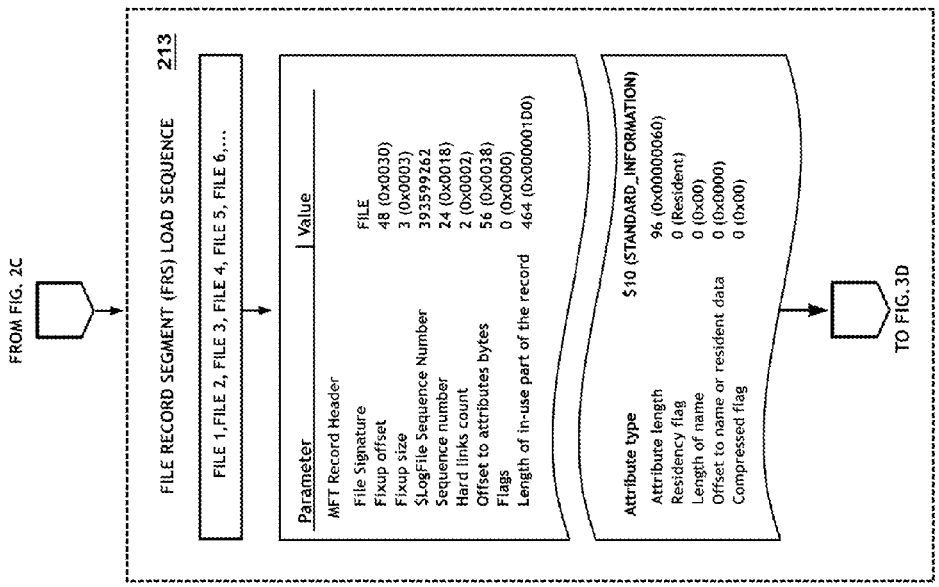
FIG. 2E is a technical schematic representations of File Record Segment (FRS) loading sequence in accordance with one implementation of the present invention.

Upon acquiring the $MFT logical cluster number ($MftStartLcn) the present invention executes $MFT subroutines FIG. 2A Step (212) to load and parse the $MFT; on parsing initiation, if the $MFT is fragmented, the algorithms translate and parse the $MFT $BITMAP (0xB0) attribute data runs FIG. 2D (310) while extracting the location of the fragmented clusters, using MFT "GetMftFileFragments" function via "CreateFile" API and "DeviceloControl" by way of control code FSCTL_GET_RETRIEVAL_POINTERS structure FIG. 2C (322); on cluster extraction, the present invention's $MFT scanning algorithms simultaneously scan the bit array and load the target file records (FRS) FIG. 2C (326) for processing using MFT_RECORD_HEADER structures and recursive $MFT procedures; otherwise the present invention examines the $MFT attribute $DATA (0x80) data runs as shown in detail in FIG. 3C.

The present invention's recursive procedures translates and parses the data runs in FIG. 3C to locate the clusters that occupy all FRS within the $MFT; the present invention then implements a loading sequence to load the $MFT File Record Segments (FRS) as shown in FIG. 3C (213) and FIG. 3D.

Figure 5A:
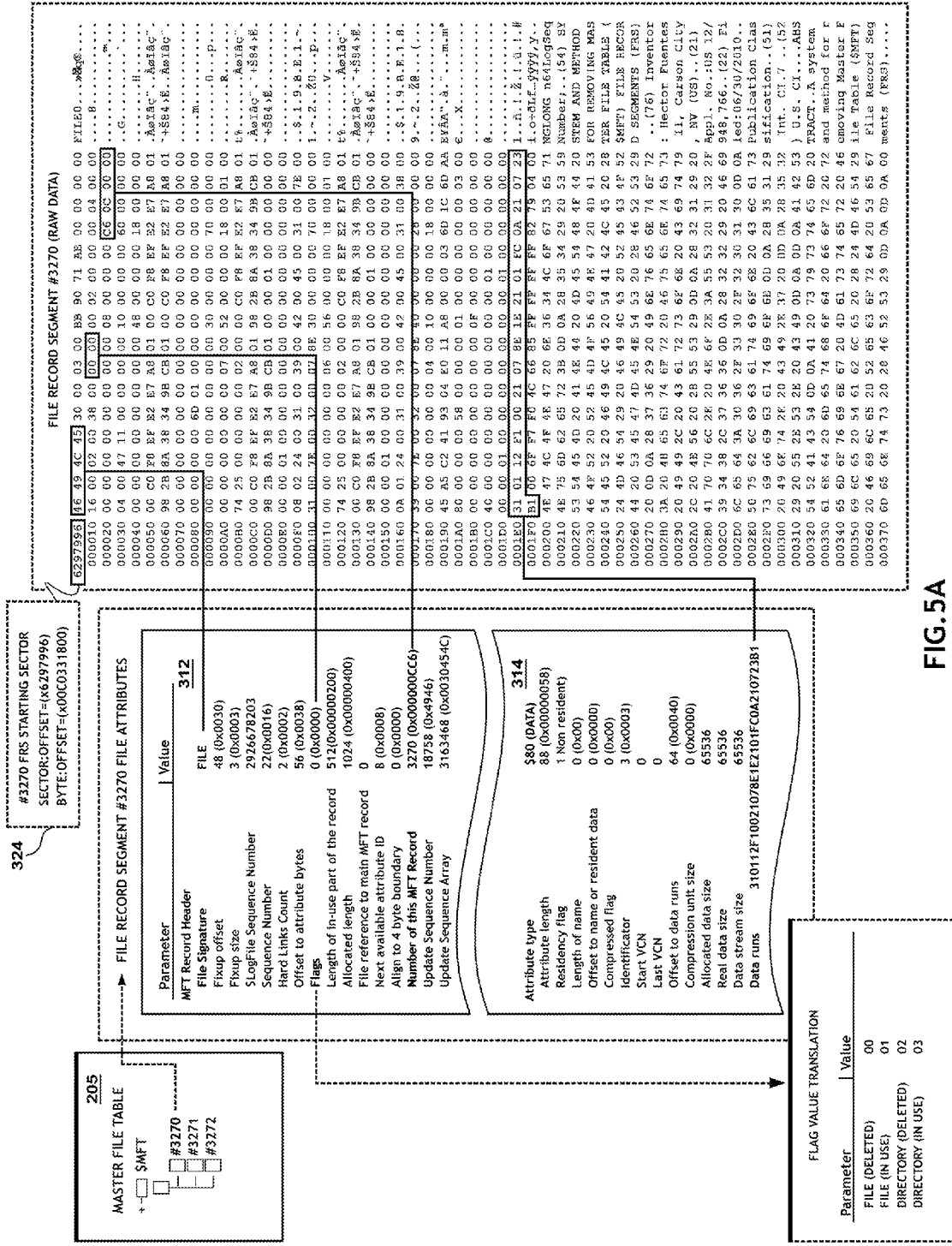
FIG. 5A is an illustrative hex-dump of a FRS occupying sectors 6297996 to 6298924 in accordance with the present invention.

While loading the File Record Segments (FRS), the present invention's $MFT scanning algorithms simultaneously scan the files record header flag parameter at offset: 0 (0x0) and at offset: 22 (0x16) to determine the target files record "FILE" type and allocation status as shown in FIG. 5A (312)

If parameters match, the present invention applies a $MFT fixup parameter by way of MFT "FixUpRecord" function, to protect data integrity and then parses the target File Record Segments (FRS) by way of MFT_RECORD_HEADER structures using $MFT recursive procedures. (As illustrated in the Appendix below $MFT header structures.)

While on loading sequence, the present invention loads all sector byte offsets accordingly for file record deletion; if a non-resident stream is present during the loading sequence, the present invention translates the data runs from attribute $DATA (0x80) in FIG. 5A (314) and records all clusters associated with the File Record Segments (FRS); on load completion, the present invention's writing modules executes an instructional writing sequence parameter to remove all traces of data located within the clusters using direct access; otherwise the present invention commences logical programming instructions to remove the FRS's by means of direct access at sector aligned FRS offsets as follows; the present invention verifies if the file record segment (FRS) is currently in use by way of MFT "IsRecordBusy" function; then executes repeating API code instructions that set the "SetFilePointer" API at File Record Segment (FRS) starting sector address (sector byte offset) FIG. 5A (312); while sequentially locking the FRS via "LockFile" API and in sequence executing writing instructions using "WriteFile" API calls via direct access while moving the file pointer "SetFilePointer" according to the write buffer calculations continuous to end-of-record sector position, overwriting each byte on the last overwrite pattern with byte character &H0 ensuring physical disk writes are performed for each File Record Segment (FRS) processed.

Figure 5B:
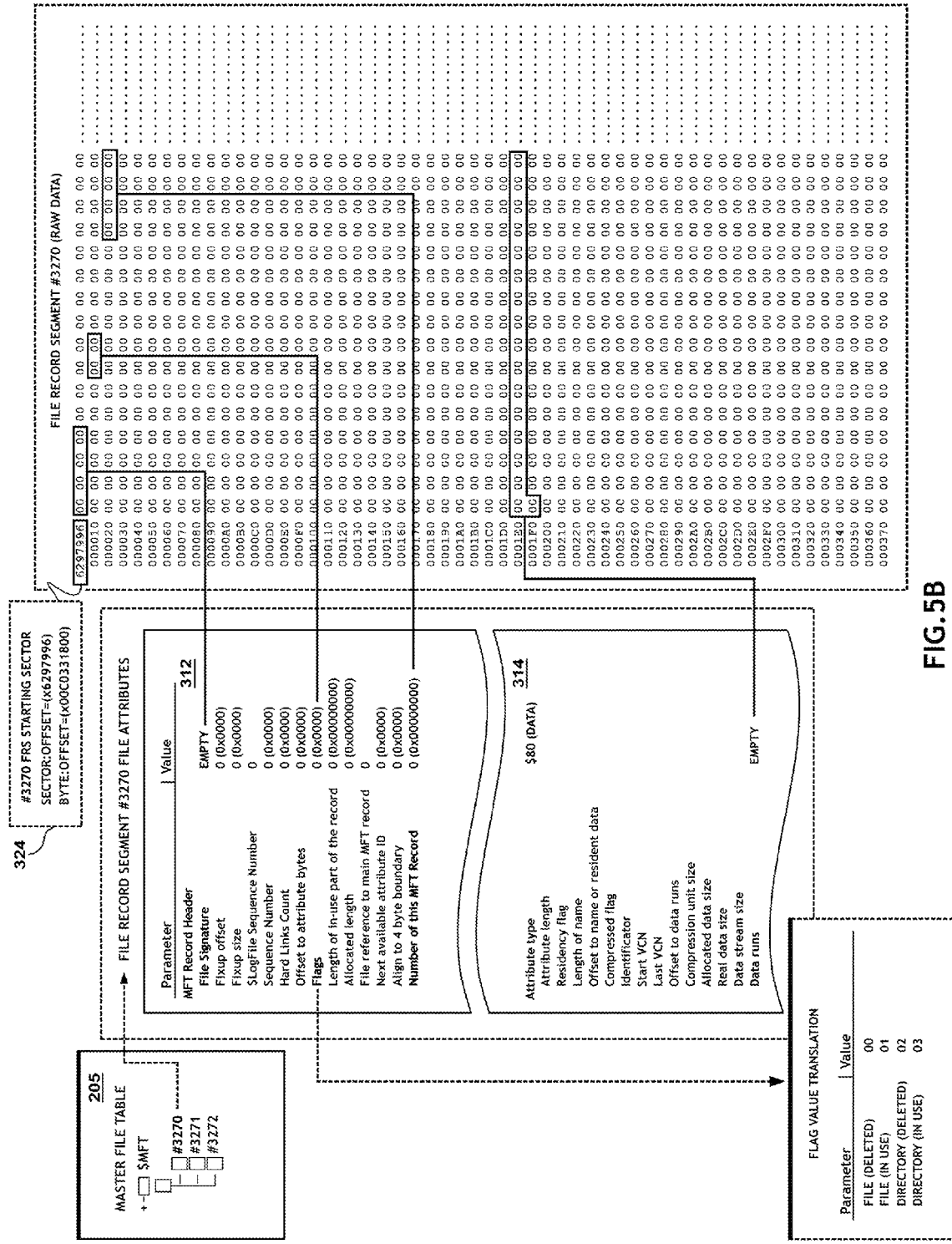
FIG. 5B is an illustrative hex-dump of the previous FRS that once occupied sectors 6297996 to 6298924 in accordance with the present invention.

As each FRS is processed the sectors that once held a file record become free FIG. 5B (312, 314); thus the file in essence never existed and since the system creates new records from its allocated $MFT Zone the free clusters in the "$MFT Reserved" and "$MFT Free" areas are reused more efficiently; thereby reducing previous file record fragmentation, resulting in greater system performance.

Figure 6:
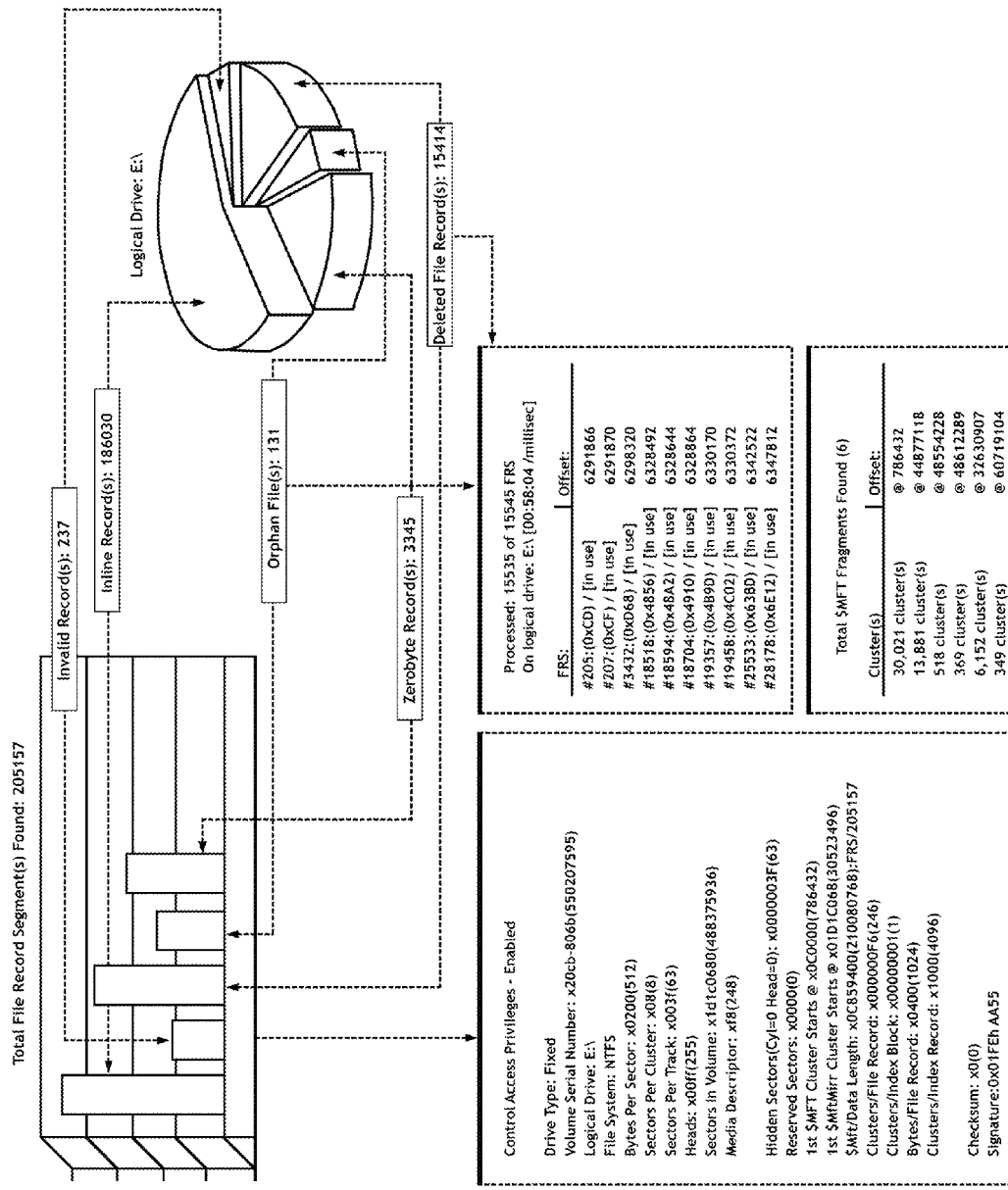
FIG. 6 is an illustrative $MFT File Record Segment (FRS) result graph in accordance with the present invention.

At end of program instructions (task), the present invention analysis modules, rescans the $MFT, assures data integrity by updating the system $LogFile via MFT "LogFileUpdate" function; while providing statistical data that verifies the forensic removal of previous $MFT file record segments (FRS) to the User FIG. 6.

APPENDIX

```
$MFT Header Structures:
MFT FILE_RECORD_HEADER in the C language
typedef struct _MFT_FILE_ENTRY_HEADER {
        char fileSignature[4];
        WORD wFixupOffset;
        WORD wFixupSize;
        LONGLONG n64LogSeqNumber;
        WORD wSequence;
        WORD wHardLinks;
        WORD wAttribOffset;
        WORD wFlags;
        DWORD dwRecLength;
        DWORD dwAllLength;
        LONGLONG n64BaseMftRec;
        WORD wNextAttrID;
        WORD wFixupPattern;
        DWORD dwMFTRecNumber;
} MFT_FILE_ENTRY_HEADER,
*P_MFT_FILE_ENTRY_HEADER;
    MFT ATTR_HEADER Structure in the C language
typedef struct _NTFS_ATTRIBUTE {
DWORD dwType;
DWORD dwFullLength;
BYTE uchNonResFlag;
BYTE uchNameLength;
WORD wNameOffset;
WORD wFlags;
WORD wID;
union ATTR {
        struct RESIDENT {
            DWORD dwLength;
            WORD wAttrOffset;
            BYTE uchIndexedTag;
            BYTE uchPadding;
        } Resident;
        struct NONRESIDENT {
            LONGLONG n64StartVCN;
            LONGLONG n64EndVCN;
            WORD wDatarunOffset;
            WORD wCompressionSize;
            BYTE uchPadding[4];
            LONGLONG n64AllocSize;
            LONGLONG n64RealSize;
            LONGLONG n64StreamSize;
        } NonResident;
} Attr;
} _NTFS_ATTRIBUTE, *P_NTFS_ATTRIBUTE;
MFT MFT_RECORD_INFO Structure in VB6
Private Type MFT_RECORD_INFO
    nodeRef As INODE_REFERENCE
    mainRef As INODE_REFERENCE
    parentRef As INODE_REFERENCE
    Flags As Byte
    Type As Byte
    FileName As String
End Type
MFT FILE_RECORD_HEADER Structure in VB6
Public Type FILE_RECORD_HEADER
    RecHdr As NTFS_RECORD_HEADER
    wSequenceNumber As Integer
    wLinkCount As Integer
    wAttributeOffset As Integer
    wFlags As Integer
    dwBytesInUse As Long
    dwBytesAllocated As Long
```

APPENDIX-continued

```
            BaseFileRecord As INODE_REFERENCE
            wNextAttributeNumber As Integer
            wPadding As Integer
            dwMFTRecordNumber As Long
            wUpdateSeqNum As Integer
        End Type
    MFT ATTR_HEADER Structure in VB6
    Public Type ATTR_HEADER
            dwType As Long
            dwFullLength As Long
            uchNonResFlag As Byte
            uchNameLength As Byte
            wNameOffset As Integer
            wFlags As Integer
            wID As Integer
        End Type
    MFT ATTR_RESIDENT Structure in VB6
    Public Type ATTR_RESIDENT
            dwLength As Long
            wAttrOffset As Integer
            uchIndexedTag As Byte
            uchPadding As Byte
        End Type
    MFT ATTR_NONRESIDENT Structure in VB6
    Public Type ATTR_NONRESIDENT
            n64StartVCN As LARGE_INTEGER
            n64EndVCN As LARGE_INTEGER
            wDatarunOffset As Integer
            wCompressionSize As Integer
            uchPadding(3) As Byte
            n64AllocSize As LARGE_INTEGER
            n64RealSize As LARGE_INTEGER
            n64StreamSize As LARGE_INTEGER
        End Type
```

As can be seen from the foregoing detailed description, the present invention provides exemplary embodiments for a system and method for the removal of File Record Segments (FRS) from a Master File Table ($MFT) of a New Technology File System (NTFS). Although the invention has been described in language specific to computer programmed instructions and/or mathematical logical operations relevant to a computerized process, the scope of the various embodiments described herein is not limited by these exemplary embodiments. The present invention's program logic and executable instructions described herein may be embodied in various forms, including but not limited to a source code form, a computer executable form, and various intermediate forms. Those skilled in the art can readily recognize that numerous variations and substitutions may be made in the invention, its use, and its configuration to achieve substantially the same results as achieved by the exemplary embodiments described herein. Therefore, a number of variations, modifications, and alternative constructions fall within the spirit and scope of the disclosed invention as expressed in the claims.

What is claimed is:

1. A computer implemented method, comprising the steps of:
   directing a physical storage device, a memory, and a processor in accessing a Master File Table ($MFT) associated with a New Technology File System (NTFS) volume to remove a File Record Segment (FRS) from the SMFT residing in the physical storage device:
   identifying at least one said File Record Segment to be removed from said Master File Table ($MFT) associated with said New Technology File System (NTFS) volume;
   reading a New Technology File System (NTFS) volume Boot Sector;
   loading a Bios Parameter Block (BPB) data structure;
   determining a position of said Master File Table ($MFT) Physical Disk Address starting cluster;
   determining said Master File Table ($MFT) Valid Data Length;
   determining wherein said Master File Table ($MFT) associated with said New Technology File System (NTFS) volume is fragmented, to translate and parse a $BITMAP attribute data runs inside said Master File Table ($MFT);
   extract a fragmented cluster within said Master File Table ($MFT);
   scan a bit array;
   determine said File Record Segment to be removed;
   load a File Record Segment sector byte offset;
   verify if said File Record Segment is currently in use;
   set a file pointer at a File Record Segment starting sector byte offset;
   lock said File Record Segment;
   move said file pointer from said File Record Segment starting sector byte offset continuous to a File Record Segment end of sector byte offset, while overwriting each byte on a last overwrite pattern with a byte character 0;
   wherein said Master File Table ($MFT) associated with said New Technology File System (NTFS) volume is not fragmented, to read a File Record Segment header flag parameter at a File Record Segment sector offset 22;
   determine said File Record Segment to be removed;
   load a File Record Segment sector byte offset;
   verify if said File Record Segment is currently in use;
   set a file pointer at a File Record Segment starting sector byte offset;
   lock said File Record Segment; and
   move said file pointer from said File Record Segment starting sector byte offset continuous to a File Record Segment end of sector byte offset, while overwriting each byte on a last overwrite pattern with a byte character 0.

2. A computer system comprising: one or more computing devices configured to perform operations comprising:
   a physical storage device, a memory, and a processor in accessing a Master File Table ($MFT) associated with a New Technology File System (NTFS) volume to remove a File Record Segment (FRS) from the $MFT located on the physical storage device of a computer system:
   acquire direct access to read a New Technology File System (NTFS) volume Boot Sector;
   load a Bios Parameter Block (BPB) data structure;
   determine a position of a Master File Table ($MFT) Physical Disk Address starting cluster;
   determine a Master File Table ($MFT) Valid Data Length;
   detect wherein said Master File Table ($MFT) associated with said New Technology File System (NTFS) volume is fragmented, to translate and parse a Master File Table ($MFT) $BITMAP attribute data runs;
   extract a fragmented cluster within said Master File Table ($MFT);
   scan a bit array;
   determine said File Record Segment to be removed;
   load a File Record Segment sector byte offset;
   verify, if said File Record Segment is currently in use;
   set a file pointer at a File Record Segment starting sector byte offset;
   lock said File Record Segment;
   move said file pointer from said File Record Segment starting sector byte offset continuous to a File Record Segment end of sector byte offset;

overwrite each byte on a last overwrite pattern with a byte character 0;
wherein said Master File Table ($MFT) associated with said New Technology File System (NTFS) volume is not fragmented, then read a File Record Segment header flag parameter at a File Record Segment sector offset 22;
determine said File Record Segment to be removed;
load a File Record Segment sector byte offset;
verify if said File Record Segment is currently in use;
set a file pointer at a File Record Segment starting sector byte offset;
lock said File Record Segment;
move said file pointer from said File Record Segment starting sector byte offset continuous to a File Record Segment end of sector byte offset; and overwrite each byte on a last overwrite pattern with a byte character 0.

* * * * *